United States Patent
Yoshikawa et al.

(10) Patent No.: US 10,357,937 B2
(45) Date of Patent: Jul. 23, 2019

(54) FIBER LAMINATE, METHOD FOR MANUFACTURING FIBER LAMINATE, AND FIBER REINFORCED COMPOSITE

(71) Applicant: KABUSHIKI KAISHA TOYOTA JIDOSHOKKI, Kariya-shi, Aichi-ken (JP)

(72) Inventors: Genki Yoshikawa, Kariya (JP); Ryuta Kamiya, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 12 days.

(21) Appl. No.: 15/741,302

(22) PCT Filed: Jun. 20, 2016

(86) PCT No.: PCT/JP2016/068252
§ 371 (c)(1),
(2) Date: Jan. 2, 2018

(87) PCT Pub. No.: WO2017/006754
PCT Pub. Date: Jan. 12, 2017

(65) Prior Publication Data
US 2018/0194098 A1 Jul. 12, 2018

(30) Foreign Application Priority Data
Jul. 7, 2015 (JP) .................................. 2015-136089

(51) Int. Cl.
*B32B 5/12* (2006.01)
*B32B 3/26* (2006.01)
(Continued)

(52) U.S. Cl.
CPC .............. *B32B 3/263* (2013.01); *B32B 5/022* (2013.01); *B32B 5/12* (2013.01); *B32B 5/26* (2013.01);
(Continued)

(58) Field of Classification Search
CPC ..... Y10T 428/24124; Y10T 428/24612; B32B 3/263; B32B 5/12; B32B 5/26; B32B 2260/023
See application file for complete search history.

(56) References Cited

FOREIGN PATENT DOCUMENTS

| JP | 04-000530 U1 | 1/1992 |
| JP | 2013-221114 A | 10/2013 |

OTHER PUBLICATIONS

International Search Report for PCT/JP2016/068252 dated Sep. 6, 2016 [PCT/ISA/210].
(Continued)

*Primary Examiner* — Alexander S Thomas
(74) *Attorney, Agent, or Firm* — Sughrue Mion, PLLC

(57) ABSTRACT

A fiber laminate W is configured by laminating first to fourth fiber layers. The fiber laminate is provided with a taper section, in which the thickness changes depending on the position in the longitudinal direction. The first to fourth fiber layers are formed by discontinuous fibers and are configured with the orientation angles of the discontinuous fibers aligned in one direction. The orientation angles of the discontinuous fibers in the first to fourth fiber layers are different. In addition, the first to fourth fiber layers are provided with thickness changing sections, in which the thickness changes continuously while the density of fibers is kept constant irrespective of the position in the longitudinal direction. The taper section is configured by stacking the thickness changing sections. The change amount of the
(Continued)

thickness of each thickness changing section is the same irrespective of the position in the longitudinal direction.

5 Claims, 4 Drawing Sheets

(51) Int. Cl.
  *B32B 5/26*  (2006.01)
  *C08J 5/04*  (2006.01)
  *D04H 1/4374*  (2012.01)
  *D04H 1/74*  (2006.01)
  *B32B 5/02*  (2006.01)
  *B32B 37/10*  (2006.01)
  *B32B 37/20*  (2006.01)

(52) U.S. Cl.
  CPC .............. *B32B 37/10* (2013.01); *B32B 37/20* (2013.01); *C08J 5/04* (2013.01); *D04H 1/4374* (2013.01); *D04H 1/74* (2013.01); *B32B 2250/04* (2013.01); *B32B 2250/05* (2013.01); *B32B 2250/20* (2013.01); *B32B 2260/023* (2013.01); *B32B 2260/046* (2013.01); *B32B 2262/106* (2013.01); *B32B 2305/22* (2013.01); *B32B 2307/558* (2013.01); *B32B 2307/706* (2013.01); *B32B 2307/708* (2013.01); *B32B 2307/72* (2013.01); *B32B 2419/00* (2013.01); *B32B 2605/00* (2013.01); *B32B 2605/08* (2013.01); *B32B 2605/12* (2013.01); *B32B 2605/18* (2013.01); *C08J 2300/00* (2013.01); *Y10T 428/24124* (2015.01); *Y10T 428/24612* (2015.01)

(56) References Cited

OTHER PUBLICATIONS

International Preliminary Report on Patentability dated Jan. 9, 2018, in counterpart International Application No. PCT/JP2016/068252.

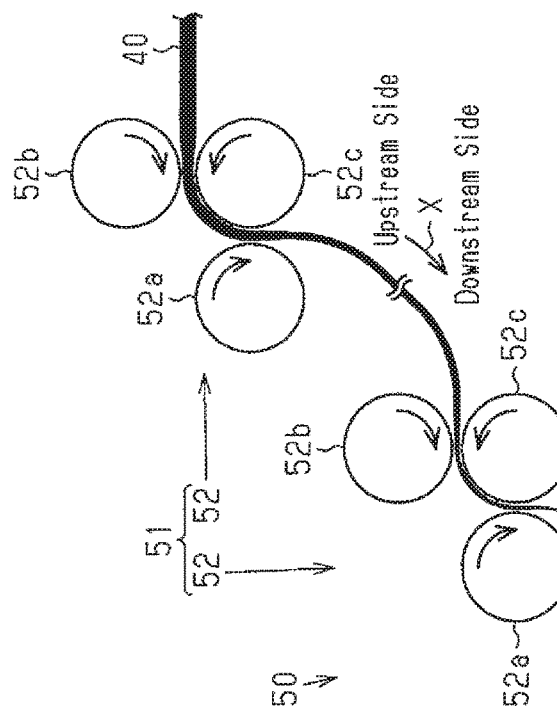
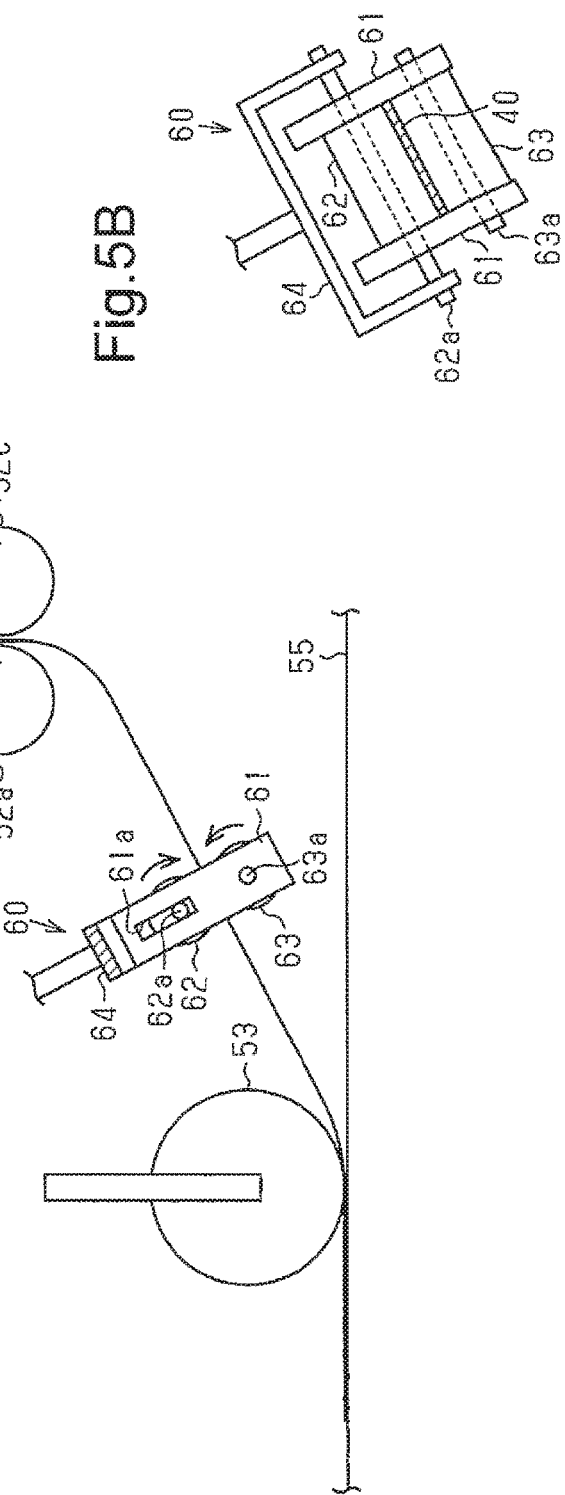

FIBER LAMINATE, METHOD FOR MANUFACTURING FIBER LAMINATE, AND FIBER REINFORCED COMPOSITE

CROSS REFERENCE TO RELATED APPLICATIONS

This application is a National Stage of International Application No. PCT/JP2016/068252 filed Jun. 20, 2016, claiming priority based on Japanese Patent Application No. 2015-136089 filed Jul. 7, 2015, the contents of all of which are incorporated herein by reference in their entirety.

TECHNICAL FIELD

The present invention relates to a fiber laminate configured by stacking a plurality of fiber layers, a method for manufacturing the fiber laminate, and a fiber reinforced composite.

BACKGROUND ART

A fiber reinforced composite is widely used as a lightweight structural material. As a reinforced base material for the fiber reinforced composite, there is a fiber laminate. The fiber reinforced composite is formed by impregnating matrix resin into the fiber laminate. The fiber reinforced composite is used as structural materials of rockets, airplanes, automobiles, ships, and buildings. There is also a fiber reinforced composite configured by changing the thickness according to a shape in use.

As shown in FIG. 7, a fiber laminate 80 disclosed in Patent Document 1 is configured by stacking a plurality of sheet-shaped reinforced fibers 81. The fiber laminate 80 includes a base 82, an intermediate section 83, and a surface layer section 84. In the base 82, the sheet-shaped reinforced fibers 81 are stacked to have a uniform thickness. In the intermediate section 83, the sheet-shaped reinforced fibers 81 are stacked with the ends of the sheet-shaped reinforced fibers 81 shifted stepwise. The surface layer section 84 covers the entire surfaces of the base 82 and the intermediate section 83. The thickness of the fiber laminate 80 is gradually changed by shifting the ends of the sheet-shaped reinforced fibers 81 in the intermediate section 83.

Patent Document 2 discloses a fiber laminate including fiber layers in which short fibers (discontinuous fibers) are oriented in a predetermined direction in order to improve the shape-imparting properties to a complicated structure such as a curved surface structure of the fiber laminate and cause the fiber laminate to exhibit the strength in the predetermined direction.

However, if the thickness of the fiber laminate is continuously changed as disclosed in Patent Document 1 in the fiber laminate including the fiber layers in which the discontinuous fibers are oriented in the predetermined direction, a problem described below occurs. That is, when the fiber layers are stacked with ends of the fiber layers shifted, in a portion where the thickness of the fiber laminate continuously changes, the number of stacked layers of the fiber layers is different depending on the position in the layer direction. Therefore, each time the thickness of the fiber laminate changes near the ends of the fiber layers, the orientation of the discontinuous fibers changes and the physical properties of the fiber laminate vary.

PRIOR ART DOCUMENTS

Patent Documents

Patent Document 1: Japanese Laid-Open Utility Model Publication No. 4-530
Patent Document 2: Japanese Laid-Open Patent Publication No. 2013-221114

SUMMARY OF THE INVENTION

Problems that the Invention is to Solve

An objective of the present invention is to provide a fiber laminate, a method for manufacturing the fiber laminate, and a fiber reinforced composite that can suppress variation of the physical properties in a portion where the thickness continuously changes.

Means for Solving the Problems

To achieve the foregoing objective and in accordance with a first aspect of the present disclosure, a fiber laminate is provided that includes, at least in a part, a taper section, a thickness of which continuously changes depending on a position in a predetermined direction. The fiber laminate is configured by stacking a plurality of fiber layers. Each fiber layer is formed by discontinuous fibers and configured with orientation angles of the discontinuous fibers aligned in one direction. The orientation angles of the discontinuous fibers of at least two fiber layers among the fiber layers are different. Each of the fiber layers includes a thickness changing section, a thickness of which continuously changes while a density of fibers is kept constant irrespective of a position in the predetermined direction. The taper section is configured by stacking a plurality of the thickness changing sections, and a change amount of the thicknesses of each thickness changing section is the same irrespective of a position in the predetermined direction.

To achieve the foregoing objective and in accordance with a second aspect of the present disclosure, a method for manufacturing a fiber laminate is provided. The fiber laminate includes, at least in a part, a taper section, a thickness of which continuously changes depending on a position in a predetermined direction. The fiber laminate is configured by stacking a plurality of fiber layers. Each fiber layer is formed by discontinuous fibers and configured with orientation angles of the discontinuous fibers aligned in one direction. The orientation angles of the discontinuous fibers of at least two fiber layers among the fiber layers are different. Each fiber layer is manufactured by stretching a web formed by the discontinuous fibers with a web drafter including a roller section formed by a plurality of roller groups. Circumferential velocities of the roller groups are relatively differentiated such that a thickness continuously changes while a density is kept constant irrespective of a position in the predetermined direction, thereby differentiating a draft rate of the roller section.

To achieve the foregoing objective and in accordance with a third aspect of the present disclosure, a fiber reinforced composite is provided that is formed by impregnating a matrix resin into a reinforced base material made of fiber. The reinforced base material is the above-described fiber laminate.

BRIEF DESCRIPTION OF THE DRAWINGS

FIG. 5A is a diagram schematically showing a web drafter.

FIG. 5B is a diagram schematically showing a restricting member.

MODES FOR CARRYING OUT THE INVENTION

A fiber laminate, a method for manufacturing the fiber laminate, and a fiber reinforced component according to one embodiment of the present invention will now be described with reference to FIGS. 1 to 6.

Figure 1:
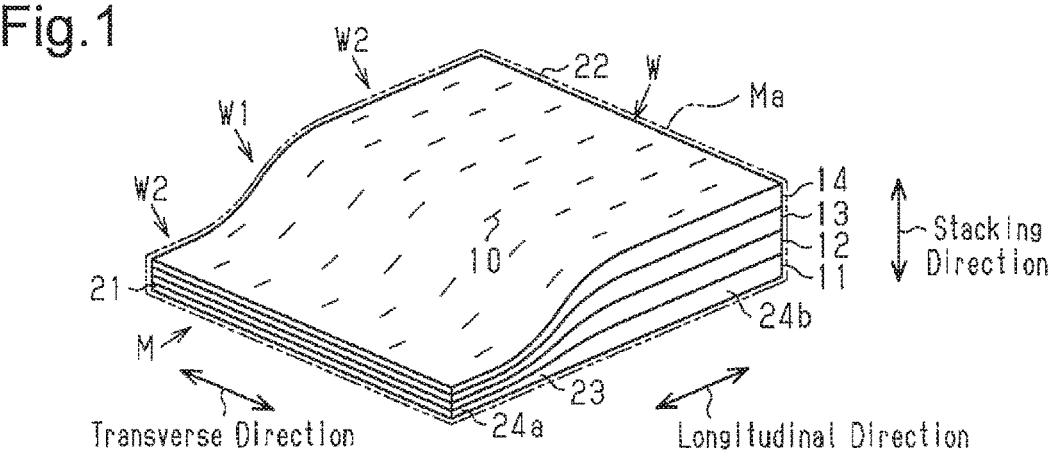
FIG. 1 is a perspective view schematically showing a fiber laminate and a fiber reinforced composite in one embodiment of the present invention.

As shown in FIG. 1, a fiber reinforced composite M is formed by impregnating matrix resin Ma into a fiber laminate W functioning as a reinforced base material. The fiber laminate W is configured by stacking four fiber layers 11 to 14. In the following explanation, concerning the four fiber layers 11 to 14, a fiber layer configuring the undermost layer of the fiber laminate W is defined as a first fiber layer 11 and a fiber layer stacked on the first fiber layer 11 in the undermost layer is defined as a second fiber layer 12. A fiber layer stacked on the second fiber layer 12 is defined as a third fiber layer 13 and a fiber layer stacked on the third fiber layer 13 and configuring an uppermost layer of the fiber laminate W is defined as a fourth fiber layer 14.

In the fiber laminate W, the direction in which the first to fourth fiber layers 11 to 14 are stacked is defined as a stacking direction. The stacking direction of the first to fourth fiber layers 11 to 14 is defined as a thickness direction. Dimensions along the thickness direction are defined as the thicknesses of the fiber layers 11 to 14. The first to fourth fiber layers 11 to 14 include rectangular surfaces in a plan view. The direction along the long sides of the surfaces of the first to fourth fiber layers 11 to 14 is defined as a longitudinal direction. The direction along the short sides of the surfaces of the first to fourth fiber layers 11 to 14 is defined as a transverse direction.

Figure 2:
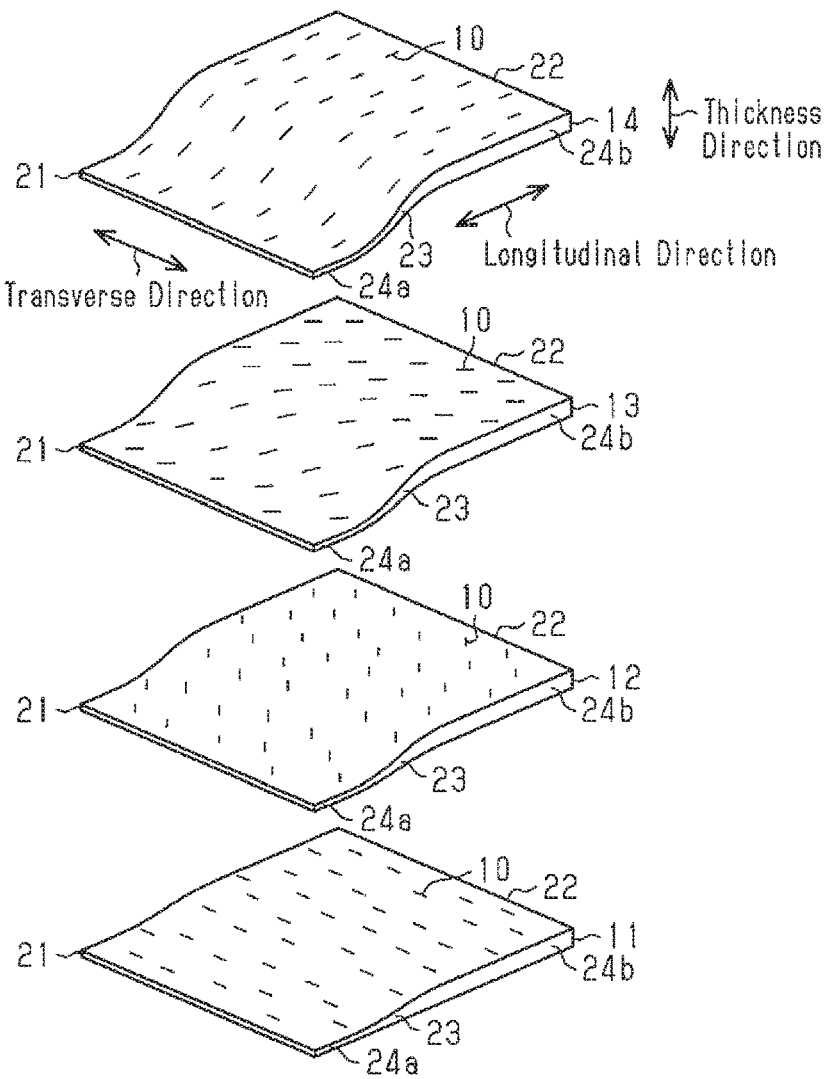
FIG. 2 is an exploded perspective view of the fiber laminate.

As shown in FIG. 2, in each of the first to fourth fiber layers 11 to 14, the discontinuous fibers 10 are aligned in one direction to be uniaxially oriented. As a method for aligning the discontinuous fibers 10, any of a carding system using a carding machine, a paper system using a paper machine, a gilling system using a gilling machine, and the like may be employed.

The discontinuous fibers 10 are configured by, for example, carbon fibers. The orientation angle of the discontinuous fibers 10 in the first fiber layer 11 is 90 degrees. The discontinuous fibers 10 are aligned in a state in which the discontinuous fibers 10 extend in the transverse direction of the first fiber layer 11. The orientation angle of the discontinuous fibers 10 in the second fiber layer 12 is 45 degrees. The discontinuous fibers 10 are aligned in a state in which the discontinuous fibers 10 tilt by 45 degrees with respect to the longitudinal direction of the second fiber layer 12. The orientation angle of the discontinuous fibers 10 in the third fiber layer 13 is −45 degrees. The discontinuous fibers 10 are aligned in a state in which the discontinuous fibers 10 tilt by −45 degrees with respect to the longitudinal direction of the third fiber layer 13. The orientation angle of the discontinuous fibers 10 in the fourth fiber layer 14 is 0 degree. The discontinuous fibers 10 are aligned in the longitudinal direction of the fourth fiber layer 14. Therefore, the fiber laminate W has pseudo isotropy in four directions on the basis of the orientation angles in the four directions of the discontinuous fibers 10 in the first to fourth fiber layers 11 to 14.

Figure 3:
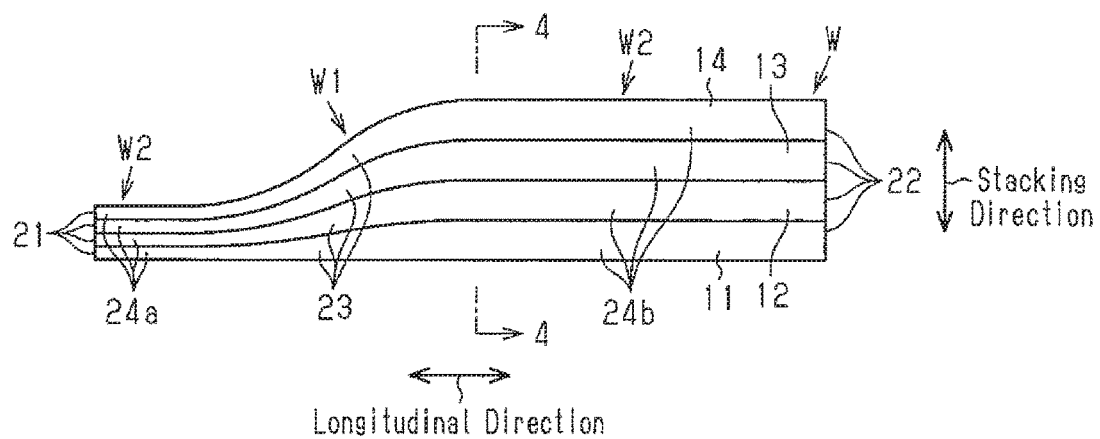
FIG. 3 is a side view showing the fiber laminate.
Figure 4:
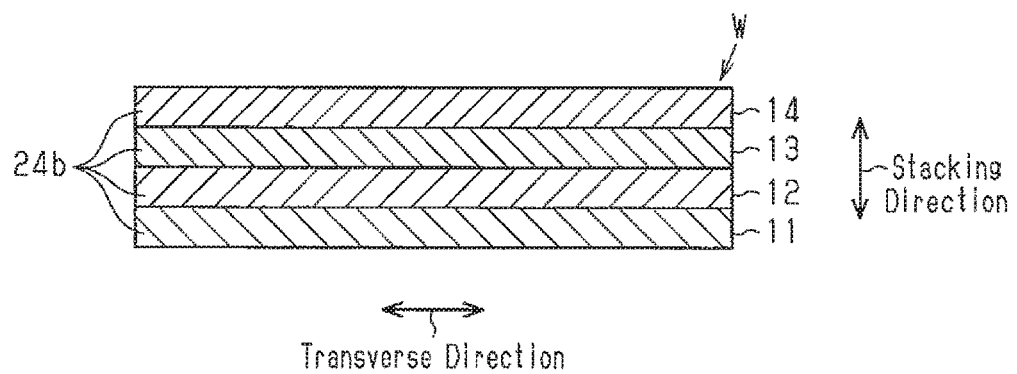
FIG. 4 is a sectional view taken along a 4-4 line in FIG. 3.

As shown in FIGS. 3 and 4, the thicknesses of the first to fourth fiber layers 11 to 14 are the smallest at first ends 21 in the longitudinal direction and is the largest at second ends 22 in the longitudinal direction. The first to fourth fiber layers 11 to 14 include first unchanging-thickness sections 24a, the thicknesses of which are constant from the first ends 21 toward the second ends 22. The first to fourth fiber layers 11 to 14 include thickness changing sections 23, which are continuous to the first unchanging-thickness sections 24a in the longitudinal direction and the thicknesses of which continuously change. Further, the first to fourth fiber layers 11 to 14 include, near the second ends 22, second unchanging-thickness sections 24b, which is continuous to the thickness changing sections 23 in the longitudinal direction and the thicknesses of which are constant.

The thicknesses of the first unchanging-thickness sections 24a are constant irrespective of the position in the longitudinal direction. The thicknesses of the second unchanging-thickness sections 24b are constant irrespective of the position in the longitudinal direction and are larger than the thicknesses of the first unchanging-thickness sections 24a.

The thickness changing sections 23 are portions between the first unchanging-thickness sections 24a and the second unchanging-thickness sections 24b. The thicknesses of the thickness changing sections 23 continuously increase from the first unchanging-thickness sections 24a toward the second unchanging-thickness sections 24b.

The densities of fibers of the first to fourth fiber layers 11 to 14 are the same in any positions in the longitudinal direction. That is, the densities of the fibers of the first to fourth fiber layers 11 to 14 are the same in the first unchanging-thickness sections 24a, the thickness changing sections 23, and the second unchanging-thickness sections 24b.

In the thickness changing sections 23, the thicknesses of the first to fourth fiber layers 11 to 14 are different depending on the position in the longitudinal direction. However, the densities of the fibers of the first to fourth fiber layers 11 to 14 are the same respectively in any positions of the thickness changing sections 23. Therefore, in the fiber laminate W, the change amounts of the thicknesses in the thickness changing sections 23 are the same in any positions in the longitudinal direction. This is because a web of the discontinuous fibers 10 is stretched by a web drafter 50 to change the thicknesses of the first to fourth fiber layers 11 to 14.

The thicknesses of the first to fourth fiber layers 11 to 14 are the same in any positions of the thickness changing sections 23. The thicknesses of the first to fourth fiber layers 11 to 14 are the same in any positions of the first unchanging-thickness sections 24a. The thicknesses of the first to fourth fiber layers 11 to 14 are the same in any positions of the second unchanging-thickness sections 24b. Therefore, the physical properties of the first to fourth fiber layers 11 to 14 are the same in any positions of the thickness changing sections 23, the first unchanging-thickness sections 24a, and the second unchanging-thickness sections 24b.

In any positions in the longitudinal direction and the transverse direction of the fiber laminate W, the density of fibers is the same and there are no differences in the physical properties such as the strength and the shape-imparting properties of the fiber laminate W. The fiber laminate W includes a taper section W1, where the thickness changing sections 23 are stacked, and constant thickness sections W2 respectively in a position where the first unchanging-thickness sections 24a are stacked and a position where the second unchanging-thickness sections 24b are stacked. In any position in the longitudinal direction of the taper section W1, which is a predetermined direction, the density of fibers is the same and there are no differences in the physical properties such as the strength and the shape-imparting properties. Since the discontinuous fibers 10 are oriented at an interval of 45 degrees when viewed in the stacking direction, the fiber laminate W has pseudo isotropy in the four directions.

In any positions in the longitudinal direction of the constant thickness sections W2, which is the predetermined direction, the thicknesses are constant, the density of fibers is the same, and there are no difference in the physical properties such as the strength and the shape-imparting properties. Since the discontinuous fibers 10 are oriented at an interval of 45 degrees when viewed in the stacking direction, the fiber laminate W has pseudo isotropy in the four directions.

Methods for manufacturing the first to fourth fiber layers 11 to 14 will now be described.

First, the method for manufacturing the fourth fiber layer 14 will be described. As shown in FIG. 5A, the fourth fiber layer 14 is formed by stretching, with the web drafter 50, a wide fiber bundle (hereinafter referred to as web) formed from discontinuous fibers. The web drafter 50 includes a conveyor 55, which conveys a fiber layer manufactured from a web 40, a roller section 51, which stretches (drafts) the web 40, a guide roller 53, which guides the web 40 stretched by the roller section 51 toward the conveyor 55, and a restricting member 60, which restricts the width of the web 40 on the downstream side of the roller section 51. The web 40 passes the roller section 51 and passes the restricting member 60 and is thereafter delivered to the conveyor 55 by the guide roller 53. The flowing direction of the web 40 in the web drafter 50 is defined as a flowing direction X.

The roller section 51 includes a plurality of roller groups 52. Each of the roller groups 52 includes three rollers 52a, 52b, and 52c. The roller group 52 includes two upper rollers 52a and 52b and one lower roller 52c located between the rollers 52a and 52b. The three rollers 52a, 52b, and 52c are driven at the same circumferential velocity to transfer the web 40 while holding the web 40 with the lower roller 52c and the upper rollers 52a and 52b. The circumferential velocities of the roller groups 52 are changeable. A desired draft rate is obtained by setting the circumferential velocity of the roller group 52 on the downstream side higher than the circumferential velocity of the roller group 52 on the upstream side.

The restricting member 60 of the web drafter 50 restricts the width of the web 40.

As shown in FIGS. 5A and 5B, the restricting member 60 includes a rectangular tabular pair of guides 61 located at the opposite ends in the width direction of the web 40. A first roller 62 and a second roller 63 are rotationally supported by the pair of guides 61. The guides 61 include guide grooves 61a extending in the longitudinal direction.

A rotary shaft 62a of the first roller 62 is inserted into the guide groove 61a of the guide 61. The opposite ends of the rotary shaft 62a are rotationally supported by a supporting member 64. The supporting member 64 is moved in a direction in which the first roller 62 is brought close to and away from the second roller 63 by a driving section (not shown). A rotary shaft 63a of the second roller 63 is rotationally supported by the guide 61. Unlike the first roller 62, the second roller 63 is incapable of moving in the longitudinal direction of the guide 61. Therefore, it is possible to adjust the size of the interval between the first roller 62 and the second roller 63 by moving the first roller 62 in the longitudinal direction of the guide groove 61a with the supporting member 64. In this way, it is possible to adapt the interval between the first roller 62 and the second roller 63 to the thickness of the web 40 by bringing the first roller 62 close to and away from the second roller 63.

When the fourth fiber layer 14 is manufactured by the web drafter 50, first, on the supply side of the web 40 (upstream in the flowing direction X), the discontinuous fibers 10 in the web 40 are aligned in one direction by any desirable method. Specifically, the discontinuous fibers 10 are aligned along the flowing direction X.

Subsequently, the roller groups 52 are driven to convey the web 40. At this time, the circumferential velocity of the most upstream roller group 52 is set constant and the circumferential velocities of the roller groups 52 on the downstream side are set higher than the circumferential velocity of the most upstream roller group 52. Consequently, the thickness of the web 40 discharged from the most downstream roller group 52 is smaller than the thickness of the web 40 at a point in time when the web 40 passes the most upstream roller group 52. Accordingly, as the circumferential velocities of the roller groups 52 on the downstream side are set higher than the circumferential velocity of the most upstream roller group 52, the thickness of the web 40 discharged from the most downstream roller group 52 can be further reduced. Therefore, if the circumferential velocities of the roller groups 52 on the downstream side are continuously increased, the thickness of the web 40 can be continuously reduced. Moreover, unlike a method of compressing and thinning the web 40, the number of fibers per unit area decreases according to the reduction of the thickness of the web 40. The density of the discontinuous fibers 10 is kept constant.

When the thickness of the web 40 is continuously changed according to the change of the circumferential velocities of the roller groups 52, the width of the web 40 is subsequently restricted by the pair of guides 61 of the restricting member 60. Therefore, in the web drafter 50, the width of a fiber layer obtained after the passage of the restricting member 60 is restricted to desired width. When the width of the web 40 is restricted, the thickness of the web 40 increases. According to the increase in the thickness of the web 40, the position of the first roller 62 with respect to the second roller 63 is controlled. As a result, the density of the fibers of the web 40 is kept constant irrespective of the position in the longitudinal direction. On the other hand, the web 40 is manufactured in a shape including the thickness changing sections 23, the thicknesses of which change depending on the position in the longitudinal direction, and the first and second unchanging-thickness sections 24a and 24b, the thicknesses of which are constant.

A web drafter 70 that manufactures the first to third fiber layers 11 to 13 will now be described.

Figure 6:
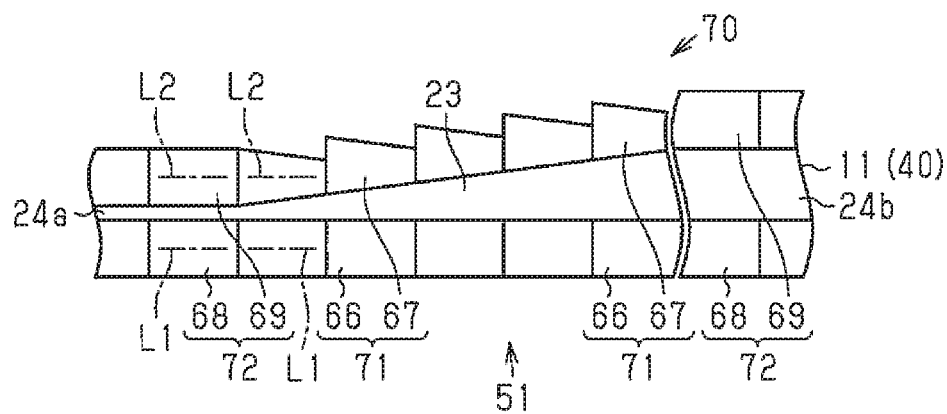
FIG. 6 is a diagram schematically showing a manufacturing apparatus for a first fiber layer.
Figure 7:
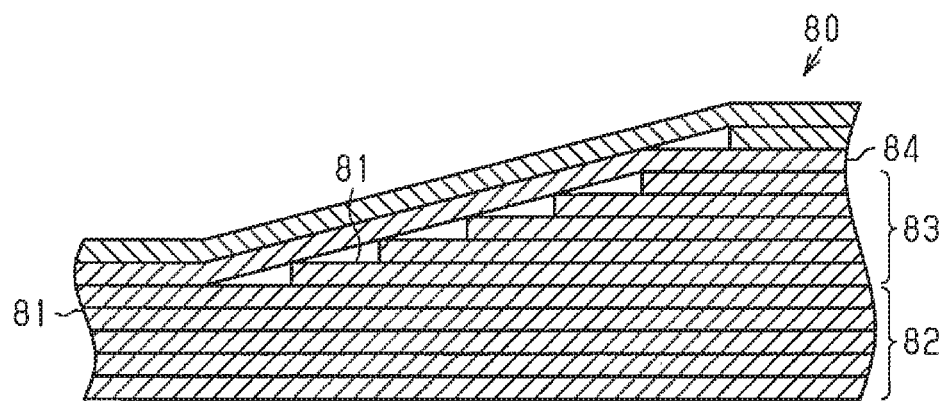
FIG. 7 is a diagram showing a background art.

As shown in FIG. 6, the web drafter 70 includes a roller section 51 including a plurality of first roller sets 71 and a plurality of second roller sets 72 disposed in the longitudinal direction of the web 40. The first roller sets 71 manufacture the thickness changing section 23 of the first fiber layer 11. The second roller sets 72 manufacture the unchanging-thickness sections 24a and 24b of the first fiber layer 11.

The first roller sets 71 include first supporting rollers 66, which support the web 40, and variable diameter rollers 67, which hold the web 40 in conjunction with the first supporting rollers 66. The first supporting rollers 66 are rollers the diameters of which are the same irrespective of the position in the axial direction of a rotation axis L1. On the other hand, the variable diameter rollers 67 are rollers the diameters of which gradually change depending on the position in the axial direction of a rotation axis L2. The variable diameter rollers 67 are disposed in a state in which the diameters gradually increase from one end to the other end in the longitudinal direction of the web 40. A plurality of variable diameter rollers 67 is disposed such that the peripheral surfaces of the variable diameter rollers 67 continue in the longitudinal direction of the web 40.

The second roller sets 72 include second supporting rollers 68, which support the web 40, and rollers 69, which hold the web 40 in conjunction with the second supporting rollers 68. The second supporting rollers 68 and the rollers 69 are rollers the diameters of which are the same irrespective of the position in the axial directions of the rotation axes L1 and L2. The peripheral surfaces of the second supporting rollers 68 are disposed to continue in the longitudinal direction of the web 40. The peripheral surfaces of the rollers 69 are also disposed to continue in the longitudinal direction of the web 40.

When the first fiber layer 11 is manufactured, parts to be the thickness changing sections 23 in the web 40 are disposed between the first supporting rollers 66 and the variable diameter rollers 67 of the roller sets 71. Parts to be the unchanging-thickness sections 24*a* and 24*b* in the web 40 are disposed between the second supporting rollers 68 and the rollers 69 of the second roller sets 72. At this time, the web 40 is supplied to the web drafter 70 in a state in which the discontinuous fibers 10 extend along the surface of the first fiber layer 11 and in a direction orthogonal to the rotation axes L1 and L2. The first roller sets 71 and the second roller sets 72 are respectively driven.

Among the first roller sets 71, the circumferential velocity of the first roller set 71 close to the first end 21 is set relatively high. That is, the draft rate of the first roller set 71 close to the first end 21 is set relatively high. Then, the thickness of the web 40 gradually increases from the first roller set 71 close to the first end 21 toward the first roller set 71 close to the second end 22. In this way, the thickness changing section 23 of the first fiber layer 11 is manufactured. The first unchanging-thickness section 24*a* is manufactured by the second roller set 72 close to the first end 21. The second unchanging-thickness section 24*b* is manufactured by the second roller set 72 close to the second end 22.

The second and third fiber layers 12 and 13 are also manufactured using web drafters in which roller sets are divided in the width direction of the web 40 like the web drafter 70. However, unlike the web drafter 70, the circumferential velocities (the draft rates) of the divided roller sets are changed depending on the positions in the longitudinal direction of the second and third fiber layers 12 and 13 such that the web 40 has desired thicknesses in divided sections.

The manufactured first to fourth fiber layers 11 to 14 are stacked and the fiber laminate W is manufactured. Thereafter, thermosetting matrix resin Ma is impregnated into the fiber laminate W and hardened. The impregnation and the hardening of the matrix resin Ma is performed by an RTM (resin transfer molding) method.

The above-described embodiment achieves the following advantages.

(1) The fiber laminate W includes the taper section W1, the thickness of which continuously changes depending on the position in the longitudinal direction. The taper section W1 is formed by stacking the thickness changing sections 23 of the first to fourth fiber layers 11 to 14. In the thickness changing sections 23, although the thicknesses continuously change, the densities of fibers are the same and the change amounts of the thicknesses are also the same. Therefore, in the taper section W1, although the thickness changes, the number of stacked layers of the fiber layers and the fiber orientations are also the same irrespective of the position in the longitudinal direction. Accordingly, in the taper section W1 of the fiber laminate W, it is possible to suppress variation of the physical properties such as the shape-imparting properties and the strength.

(2) The thickness of the taper section W1 of the fiber laminate W is changed by changing the thicknesses of the respective first to fourth fiber layers 11 to 14. With this configuration, the number of stacked layers of the fiber layers is not changed in order to change the thickness of the fiber laminate W. The ends of the fiber layers are not present in the taper section W1. Therefore, resin-rich portions in which only the matrix resin Ma is present near the ends of the fiber layers are not formed in the taper section W1. Accordingly, the strength of the fiber reinforced composite M is not reduced by the resin-rich portions.

(3) Among the first to fourth fiber layers 11 to 14, the orientation angles of the discontinuous fibers 10 of the fiber layers are set to 0 degree, 45 degrees, −45 degrees, and 90 degrees. Therefore, the fiber laminate W can have pseudo isotropy in the four directions in a plan view.

(4) In the web drafters 50 and 70, the thickness of the web 40 can be differentiated by changing the draft rate of the roller section 51. As a result, the thickness changing sections 23, the thicknesses of which change, can be manufactured in the first to fourth fiber layers 11 to 14. The first and second unchanging-thickness sections 24*a* and 24*b* can be manufactured in the first to fourth fiber layers 11 to 14 by setting the draft rate of the roller section 51 the same. Accordingly, if the web drafters 50 and 70 are used, it is possible to easily manufacture the first to fourth fiber layers 11 to 14 including the thickness changing sections 23 and the unchanging-thickness sections 24*a* and 24*b*.

(5) The web drafters 50 and 70 include the restricting member 60 that restricts stretch of the web 40 in the width direction. Therefore, it is possible to restrict the width of the web 40 to a predetermined dimension with the restricting member 60 while stretching the web 40 with the web drafters 50 and 70.

(6) The fiber laminate W is configured by stacking the fiber layers including the thickness changing sections 23. Therefore, it is possible to adjust the strength of the obtained fiber laminate W by adjusting the number of stacked layers of the fiber layers. Accordingly, in the fiber laminate W including the taper section W1, the thickness of which continuously changes, it is possible to adjust the strength while suppressing variation of the physical properties in the taper section W1.

The above-illustrated embodiments may be modified as follows.

In the above-illustrated embodiment, all the orientation angles of the discontinuous fibers 10 of the first to fourth fiber layers 11 to 14 are differentiated. However, only the orientation angles of the discontinuous fibers 10 of two or three fiber layers among the four fiber layers may be differentiated.

The fiber laminate W has the pseudo isotropy in the four directions. However, the fiber laminate W may have pseudo isotropy in three directions or six directions.

The fiber laminate W does not have to have pseudo isotropy.

In the fiber laminate W, the thickness of the taper section W1 is changed depending on the position in the longitudinal direction and the thickness of the constant thickness section W2 is set constant. However, the fiber laminate W is not limited to this. That is, the entire length of the fiber laminate W may be formed as the taper section W1 by continuously changing the thickness of the fiber laminate W over the entire length.

In the above-illustrated embodiment, the predetermined direction of the fiber laminate W is set as the longitudinal direction. However, the predetermined direction of the fiber laminate W may be set as the transverse direction.

In the above-illustrated embodiment, the fiber laminate W is configured such that the thickness of the taper section W1 continuously increases from the first end 21 toward the second end 22. However, the fiber laminate W is not limited to this. That is, the fiber laminate W may be configured such that the thickness of the taper section W1 continuously decreases from the first end 21 toward the second end 22.

The number of the roller groups 52 in the web drafters 50 and 70 may be changed as necessary.

The thickness changing sections 23 of the first to fourth fiber layers 11 to 14 may be manufactured by a method other than the method of stretching the web 40 with the web drafters 50 and 70. For example, a base in which the thickness of the fiber layers is constant and a fiber sheet separate from the base may be prepared and joined to continuously change the thickness of the fiber laminate. In this case, in the fiber sheet, the density of fibers is constant irrespective of the position in the longitudinal direction of the fiber layers.

The restricting member 60 may be removed from the web drafters 50 and 70. In this case, the fiber layers may be stacked in a state in which the widths of the first to fourth fiber layers 11 to 14 are irregular. The ends of the fiber layers may be cut after the stacking to set the widths of the fiber layers the same.

The invention claimed is:

1. A fiber laminate comprising, at least in a part, a taper section, a thickness of which continuously changes depending on a position in a predetermined direction, the fiber laminate being configured by stacking a plurality of fiber layers, wherein
    each fiber layer is formed by discontinuous fibers and configured with orientation angles of the discontinuous fibers aligned in one direction,
    the orientation angles of the discontinuous fibers of at least two fiber layers among the fiber layers are different,
    each of the fiber layers includes a thickness changing section, a thickness of which continuously changes while a density of fibers is kept constant irrespective of a position in the predetermined direction, and
    the taper section is configured by stacking a plurality of the thickness changing sections, and a change amount of the thicknesses of each thickness changing section is the same irrespective of a position in the predetermined direction.

2. The fiber laminate according to claim 1, further comprising a constant thickness section where the thickness of the fiber layer does not change irrespective of a position in the predetermined direction.

3. A fiber reinforced composite formed by impregnating a matrix resin into a reinforced base material made of fiber, wherein the reinforced base material is the fiber laminate according to claim 1.

4. A method for manufacturing a fiber laminate including, at least in a part, a taper section, a thickness of which continuously changes depending on a position in a predetermined direction, the fiber laminate being configured by stacking a plurality of fiber layers, wherein
    each fiber layer is formed by discontinuous fibers and configured with orientation angles of the discontinuous fibers aligned in one direction,
    the orientation angles of the discontinuous fibers of at least two fiber layers among the fiber layers are different,
    each fiber layer is manufactured by stretching a web formed by the discontinuous fibers with a web drafter including a roller section formed by a plurality of roller groups, and
    circumferential velocities of the roller groups are relatively differentiated such that a thickness continuously changes while a density is kept constant irrespective of a position in the predetermined direction, thereby differentiating a draft rate of the roller section.

5. The method for manufacturing a fiber laminate according to claim 4, wherein a width of the web is restricted by a restricting member on a downstream side of the roller section.

* * * * *